United States Patent [19]

Kolaczkowski et al.

[11] Patent Number: 5,418,204
[45] Date of Patent: May 23, 1995

[54] PROCESS FOR LOADING CERAMIC MONOLITH WITH CATALYST

[75] Inventors: Stanislaw T. Kolaczkowski; Semali Perera; Serpil Serbetcioglu, all of Bath, United Kingdom

[73] Assignee: Dow Corning Limited, Barry, Wales

[21] Appl. No.: 166,119

[22] Filed: Dec. 14, 1993

[30] Foreign Application Priority Data

Dec. 31, 1992 [GB] United Kingdom .................. 9227152

[51] Int. Cl.⁶ .............................................. B01J 21/04
[52] U.S. Cl. .................... 502/439; 502/340; 502/341; 502/344; 502/355; 501/153
[58] Field of Search ............... 502/439, 527, 340, 341, 502/344, 355; 501/153

[56] References Cited

U.S. PATENT DOCUMENTS

| | | | |
|---|---|---|---|
| 3,928,533 | 12/1975 | Beall et al. | 423/213.5 |
| 4,065,510 | 12/1977 | Schreyer et al. | 260/632 |
| 4,487,958 | 12/1984 | Ream et al. | 502/262 |
| 4,529,718 | 7/1985 | Dupin | 502/439 |
| 4,677,095 | 6/1987 | Wan et al. | 502/263 |
| 5,063,193 | 11/1991 | Bedford et al. | 423/213.2 |
| 5,131,142 | 7/1992 | Brasz | 29/888.02 |
| 5,210,129 | 5/1993 | Habimana et al. | 524/731 |
| 5,212,130 | 5/1993 | Addiego et al. | 502/60 |
| 5,215,953 | 6/1993 | Blumrich et al. | 502/218 |
| 5,256,755 | 10/1993 | Westall | 528/14 |

FOREIGN PATENT DOCUMENTS 4110038 12/1993 Japan .
1600588 5/1978 United Kingdom .

OTHER PUBLICATIONS

"A Dictionary of Mining, Mineral, and Related Terms," P. W. Thrush & Staff of Bureau of Mines, (1968) p. 1032.
"CRC Handbook of Chemistry and Physics," Weast; pp. B-67, B-102, B-74, B-116, B-120, B-132, B-129, B-134, F-103, 68th Edition (1988).
Monolithic Catalyst Supports; J. P. DeLuca, L. E. Campbell, pp. 293-323 (no date available).

*Primary Examiner*—Anthony McFarlane
*Attorney, Agent, or Firm*—Arne R. Jarnholm

[57] ABSTRACT

A process of loading a ceramic monolithic catalyst support with a heterogeneous water soluble catalyst comprises making a slurry of the catalyst in a mixture of from 2 to 50% by weight of water and from 98 to 50% of a liquid organic carrier, applying the slurry onto the surface of the monolithic catalyst support and allowing the slurry to dry by evaporation of the mixture of water and liquid organic carrier.

14 Claims, No Drawings

PROCESS FOR LOADING CERAMIC MONOLITH WITH CATALYST

This invention is concerned with a process for loading a ceramic monolith with catalyst. It is particularly related to a process for loading a ceramic monolith with heterogeneous water soluble catalysts.

Monolithic catalyst supports, or monoliths, are known in the art and have been described in many publications, e.g. Advanced Materials in Catalysis, Materials Sciences Series, 77, pages 293 to 324. They are traditionally mainly used for gaseous reactions, e.g. in automotive emission control systems, as described e.g. in E.P. specifications 443 905 and 460 388. Some applications involving a liquid phase are also reported. These have been done in a three phase monolithic reactor and are limited in the prior art to hydrogenation reactions, including hydrogenation of aqueous nitrobenzoic acid, α-methylstyrene, 2-ethyl-hexenal and anthraquinones. Monolithic catalyst supports may be made from any material which will not react with any of the reagents, catalysts or reaction products, except where the catalyst itself forms part of the monolithic catalyst support structure. Traditional materials used for manufacturing a monolithic catalyst supports include ceramics, metals, alloys, plastics, resins and even the heterogeneous catalyst itself or a mixture thereof with an inert binder.

Loading of monolithic catalyst supports with a number of catalyst has been described in several publications. The methods which have been described include catalyst incorporation during the manufacture of the monolithic catalyst supports, deposition of active material directly onto the monolithic catalyst support, washcoating, i.e. laying down a high surface area coating onto which the catalyst is deposited or depositing the washcoat and the catalyst at the same time.

It has been proposed e.g. in G.B. 1 600 588-A, to prepare catalysts by intimately admixing a solid, base metal component with a solid alumina support component preferably with a liquid containing a soluble or dispersed form of a catalytically active platinum group metal, followed by depositing these components on a macrosize carrier, e.g. a monolith. The alumina support is used as wash-coat to increase the size of the surface on which the catalyst is deposited. In the Derwent abstract of JP 4110038 a catalyst is deposited on a honeycomb using a mixture of gypsum, kaoline, titanium oxide and glass fibre as a wash-coat.

In many cases the active catalyst was obtained by applying a solution of the salt of the catalyst followed by further reacting the salt in order to form the active catalyst species in situ, e.g. by oxidation or precipitation. The present invention has the aim to provide a coating of the catalyst without having to change the nature of the deposited material and without the need for a wash-coat.

Although many of the methods of loading the monolithic catalyst supports work adequately for many applications, it was observed that where water soluble heterogeneous catalysts are to be loaded the known methods tend to give a coating which does not give good uniform adhesion and good appearance.

We have now found that if the heterogeneous water soluble catalysts are loaded by using a mixture of water and organic liquid carriers, a better coating of the catalyst with improved adhesion to the monolith and improved appearance is achieved.

According to the invention there is provided a process of loading a ceramic monolithic catalyst support with a heterogeneous water soluble catalyst, which comprises making a slurry of the catalyst in a mixture of from 2 to 50% by weight of water and from 98 to 50% of a liquid organic carrier, applying the slurry onto the surface of the monolithic catalyst support and allowing the slurry to dry by evaporation of the mixture of water and liquid organic carrier.

The present invention is only concerned with the use of ceramic monolithic catalyst supports. Useful materials for making ceramic monolithic catalyst supports include aluminates, silicates, alumino silicates, natural clays, cordierite, zirconia, barium titanate and silicon carbide. Ceramic monolithic catalyst supports may be made in any of the well known manners but are usually produced by moulding, extrusion or corrugation methods, which methods are well known in the art and have been described in several publications.

The monolithic catalyst supports are composed of one or more channels. If more than one these channels are usually parallel, or at least substantially parallel, to each other, and may be circular, hexagonal, square, triangular or irregular in section. The shape of the section of the channels is not important but is usually of a symmetric type as a result of the manufacturing process. The channel sections do not even have to have a consistent section for the total length of the channel. They may for example have an increasing diameter or an irregularly changing diameter over the length of the monolithic catalyst support. The use of the word diameter does not limit the channels to ones with circular sections as it indicates only a measure of the hollow of the channel. Preferably, however, the channels have a constant section shape and size for the total length of the monolithic catalyst support.

Preferred monolithic catalyst supports are those which are useful in polymerisation reactions, particularly polymerisation of organosilicon compounds. The polymerisation process using such monoliths forms the subject of a co-pending patent application. These preferred monolithic catalyst supports may have a channel diameter which is conveniently in the range of from 0.1 to 50 mm, preferably from 1 to 30 mm, more preferably from 3 to 10 mm. The number of channels provided in the monolithic catalyst support may vary depending on the desired output of the polymerisation reaction, the available area in the reactor in which the support is to be placed and the feeding method and facilities of the reactor. It is, however, envisaged that the preferred total area of monolithic catalyst supports, measured in section, would be equivalent to that of a circle with a diameter in the range of from 150 mm to 50,000 mm, more preferably 500 to 5000 mm, most preferably 1000 to 3000 mm.

The thickness of the monolithic catalyst support channel sides will effect the mechanical strength of the monolithic catalyst support. For the preferred ceramic monolithic catalyst supports the total bed voidage, i.e. the ratio of free space over space taken up by the material making up the support per unit of volume, is in the range of from 0.3 to 0.95, preferably from 0.5 to 0.8, most preferably 0.6 to 0.75.

The length of the monolithic catalyst support, i.e. its size in the direction of the flow of the reagents, could vary widely depending on the required residence time of the reagents with the catalyst, the operating temperature, the activity of the catalyst, the density of the catalyst on the surface of the monolithic catalyst support, the desired outcome of the reaction and the physical properties of the reagents and/or the reaction product. The preferred monolithic catalyst supports are provided in blocks with limited length, e.g. from 5 to 1000 mm, preferably 100 to 500 mm, and to place a number of these blocks on top of each other. In this way it becomes possible to provide a monolithic catalyst support system with a number of channels with varying diameter throughout the reactor. It is for example conceivable to have smaller channel diameters at the top of the reactor, where the reagents enter the reactor, and to increase the diameter further down the reactor to accommodate a reaction product of increasing viscosity. It is expected that in commercial situations the total length of the monolithic catalyst supports used in a reactors would be in the range of from 150 mm to 50,000 mm, more preferably 500 to 5000 mm, most preferably 1000 to 3000 mm.

Heterogeneous water soluble catalysts for use in the process of the invention are catalysts which are solid at room temperature and normal atmospheric conditions, which are soluble in water and are useful in catalysing liquid phase, gas phase or 2-phase liquid/gas reactions. Particularly preferred are heterogeneous catalysts which catalyse the production of organosilicon compounds by polymerisation of organosilicon monomers or oligomers. The production of organosilicon polymeric compounds, by the polymerisation or copolymerisation of relatively low molecular weight organosilicon compounds, is a well known step in the manufacture of commercial silicones. This process has been extensively described, e.g. for the production of organopolysiloxanes, and may include equilibration, condensation and/or addition reactions. Heterogeneous catalysts for such reactions are also well known and have been described in the literature.

Potential heterogeneous polymerisation catalysts include condensation, addition and equilibration catalysts. They have been described in a number of publications and many are commercially available. Suitable catalysts are exemplified by carboxylates of rubidium or cesium, hydroxides of magnesium, barium or strontium, borates, acetates and phosphates, e.g. $Ba(OH)_2$, $Sr(OH)_2$, $Na_2B_4O_7$, CsOAc, $K_3PO_4$, $Na_3PO_4$, $KBO_2$ and other catalysts as mentioned in the art, e.g. in G.B. patent specification 2,256,872.

The process of the invention requires the formation of a slurry of the catalyst and a mixture of water and a liquid organic carrier. Preferably no other ingredients are used in the slurry. The liquid organic carrier may be one or more of an organic hydrocarbon, alcohol, aldehyde, ether or ketone which carrier preferably has a boiling point at standard atmospheric pressure (1000 mbar) of no more than 150° C. The liquid organic carrier is preferably a liquid which will not, or at most only sparingly, dissolve the catalyst as this will make the formation of a slurry easier. It may be a mixture of more than one liquid organic carriers. It is more preferred that the liquid carrier has a boiling point at 1000 mbar of no more than 100° C. At least 2% by weight of the mixture of water and liquid organic carrier is to be water, and at least 50% by weight of said mixture is to be taken up by the liquid organic carrier. Preferably from 5 to 20% by weight of the mixture is water. Particularly preferred liquid organic carriers are lower alkanols, i.e. those having less than 6 carbon atoms, e.g. methanol, ethanol and isopropanol.

The slurry has preferably the consistency of a paste at the temperature and conditions of loading the ceramic monolithic catalyst support. The slurry can be prepared by mixing a powder form of the catalyst with the mixture of water and the liquid organic carrier till the desired consistency is achieved. If the liquid organic carrier is very volatile it is of course desirable to maintain the slurry in an atmosphere where the amount of evaporation is reduced to a minimum. Depending on the ingredients the slurry may comprise from 20 to 70% of the catalyst, preferably 30 to 50%, most preferably 35 to 45%.

In the process of the invention, the slurry is then applied to the surface of the monolithic catalyst support. This may be done in any convenient way, e.g. by standard coating techniques. Suitable techniques include dip coating, flow coating, brushing and spraying.

Once the slurry has been applied to the monolithic catalyst support, it is allowed to dry by evaporation of the mixture of water and liquid organic carrier. This may be achieved by exposing the coated support to atmospheric conditions. Where the catalyst is susceptible to degradation under such conditions alternative conditions may apply. These include the use of an inert gas atmosphere. Evaporation of the mixture of water and the liquid organic carrier may be accelerated e.g. by the use of heat or a gas flow. Best results have been achieved by allowing the majority of the mixture of water and the liquid organic carrier to evaporate at relatively lower temperatures, e.g. room temperature (around 20° C.) or up to, but not including, the temperature at which the mixture of water and the liquid organic carrier boils, followed by heating the coated monolith at higher temperatures.

It is preferred to coat the monolithic catalyst support with the catalyst in such a way that a reasonably uniform coating of the catalyst is provided, i.e. where the loading of catalyst per unit area of the support is fairly constant on average. Although it is preferred to cover the surface of the monolithic catalyst support fully with the catalyst, a patchy or patterned coating could also be used. It is particularly preferred to provide a coating which is rough to some extent, as this would increase the surface area of the catalyst bed, and hence the reactivity of the loaded monolithic catalyst support. A minimum thickness of catalyst layer would be equivalent to a molecular monolayer of the catalyst. There is no theoretical maximum thickness of the catalyst layer, although practical considerations have to be taken into account. These include the remaining empty volume in the channels of the monolithic catalyst support, the adhesion strength of the catalyst to the support as well as any cost considerations. A preferred average thickness would be in the range of from 0.05 to 2 mm, preferably 0.1 to 1 mm. The different results can be achieved to some extent by using different conditions in which the evaporation of the mixture of water and the liquid organic carrier is carried out. For example a faster initial drying or heating, above the boiling point of the mixture of water and the liquid organic carrier, will more likely result in a rougher coating. A very slow evaporation will result in a more uniform and smooth coating.

There now follow a number of examples in which the invention is illustrated in more detail.

A monolithic catalyst support tube was made from Pormulit ® alumina silicate having an inner diameter of 15 mm, a channel wall thickness of 2.5 mm and a length of 740 mm. The monolithic catalyst support was prepared for coating with tripotassium phosphate catalyst by washing the monolithic catalyst support tube with distilled water and drying it for 2 hours at 120° C.

A slurry was prepared according to Table I, of which some are examples according to the invention and some (C) comparative examples. The liquid organic carrier was 99.5% by weight pure material. The slurry was poured through the monolith tube to coat the inside of the channel to a height of 500 mm. The monolith tube was then dried in a nitrogen atmosphere at room temperature for two hours, followed by drying in an oven at 100° C. for a further hour.

TABLE I

| | Mixture Components | |
|---|---|---|
| Example | Water (in % by weight) | Organic Liquid (type) |
| 1 | 5 | n-heptane |
| 2 | 20 | n-heptane |
| 3 | 25 | toluene |
| 4 | 25 | pentanol |
| 5 | 25 | diethyl ether |
| 6 | 5 | ethanol |
| 7 | 20 | ethanol |
| 8 | 50 | ethanol |
| 9 | 15 | formaldehyde |
| 10 | 15 | acetone |
| 11 | 15 | n-butanol |
| C1 | 0 | n-heptane |
| C2 | 0 | toluene |
| C3 | 0 | pentanol |
| C4 | 0 | diethyl ether |
| C5 | 0 | ethanol |
| C6 | 100 | — |

The appearance and adhesion of the catalyst to the monolithic support was visually inspected. It was found that all the Example coatings (1 to 11) had good adhesion to the walls of the monolith tube and gave a fairly uniform slightly rough coating. All the comparative examples (C1–C6) had major flaws in the coating and peeled away from the walls.

That which is claimed is:

1. A process of loading a ceramic monolithic catalyst support with a heterogeneous water soluble catalyst comprising the steps of:
   forming a slurry from a sufficient quantity of said catalyst and a mixture of water and a liquid organic carrier;
   said water being present in said mixture in an amount between about 2 percent to about 50 percent, by weight, and said liquid organic carrier being present in said mixture in an amount between about 50 percent to about 98 percent, by weight;
   applying said slurry to the surface of said ceramic monolithic catalyst support; and thereafter
   drying said slurry by evaporation of said mixture of water and liquid organic carrier.

2. A process according to claim 1 wherein the liquid organic carrier is selected from the group consisting of an organic hydrocarbon, an alcohol, an aldehyde, an ether, a ketone, and mixtures of two or more of these, said carrier having a boiling point at standard atmospheric pressure (1000 mbar) of no more than 150° C.

3. A process according to claim 1 wherein the liquid organic carrier is selected from the group consisting of an organic hydrocarbon, an alcohol, an aldehyde, an ether, a ketone, and mixtures of two or more of these, said carrier having a boiling point at standard atmospheric pressure (1000 mbar) of no more than 100° C.

4. A process according to claim 1 in which the catalyst is insoluble in the liquid organic carrier.

5. A process according to claim 1 in which the mixture of water and the liquid organic carrier consists of from 5 to 20% by weight of water and from 80 to 95% by weight of the liquid organic carrier.

6. A process according to claim 1 wherein the liquid organic carrier is a lower alkanol having less than 6 carbon atoms.

7. A process according to claim 1 wherein the slurry has the consistency of a paste at the temperature and conditions of loading the ceramic monolithic catalyst support.

8. A process according to claim 1 wherein the slurry consists of 30 to 50% by weight of the heterogenous catalyst and of 50 to 70% by weight of the mixture of water and the liquid organic carrier.

9. A process according to claim 1 wherein the slurry is applied to the surface of the monolithic catalyst support by a method selected from the group consisting of dip coating, flow coating, brushing and spraying.

10. A process according to claim 1 wherein the evaporation of the liquid organic carrier is achieved by exposing the coated support to heat.

11. A process according to claim 1 wherein the evaporation of the liquid organic carrier is achieved by exposing the coated support to a gas flow.

12. A process according to claim 1 wherein the evaporation of the mixture of water and the liquid organic carrier is achieved by allowing the majority of the mixture to evaporate at relatively lower temperatures, followed by heating the coated monolith at higher temperatures.

13. A process according to claim 1 wherein the evaporation of the mixture of water and the liquid organic carrier is achieved by allowing the majority of the mixture to evaporate at temperatures below the boiling point of the mixture, followed by heating the coated monolith at higher temperatures.

14. A process according to claim 1 whereby the average thickness of the final catalyst coating is in the range of from 0.05 to 2 mm.

* * * * *